March 13, 1934.    L. B. KENNEDY    1,951,054
PROJECTION LANTERN
Filed June 19, 1931    4 Sheets-Sheet 1
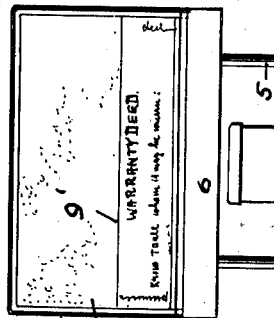
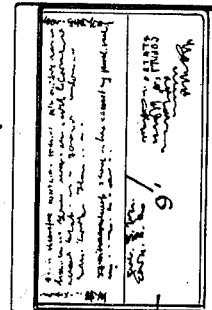
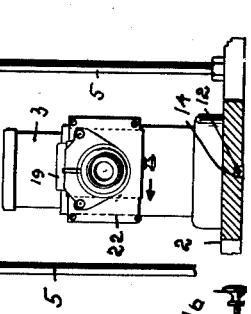
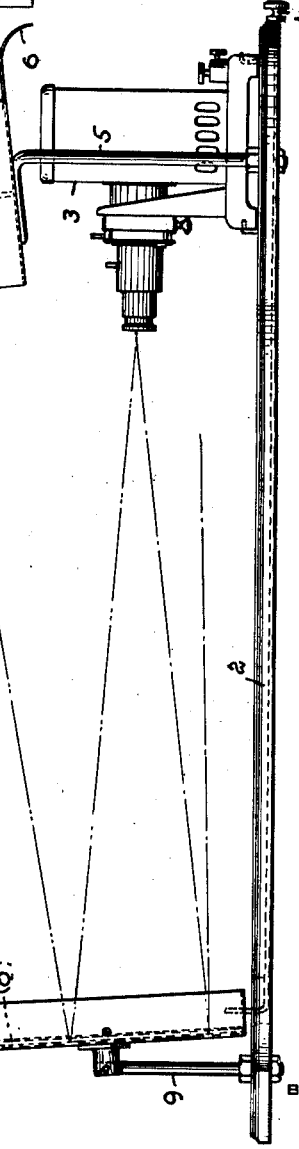
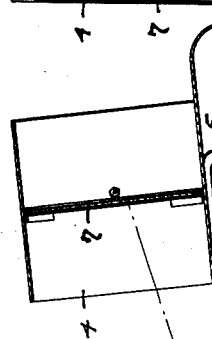
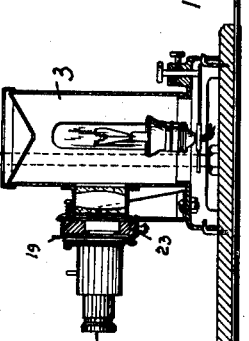
Inventor:
L. B. KENNEDY
Fisher, Moser + Moore ATTORNEY March 13, 1934.  L. B. KENNEDY  1,951,054
PROJECTION LANTERN
Filed June 19, 1931   4 Sheets-Sheet 2
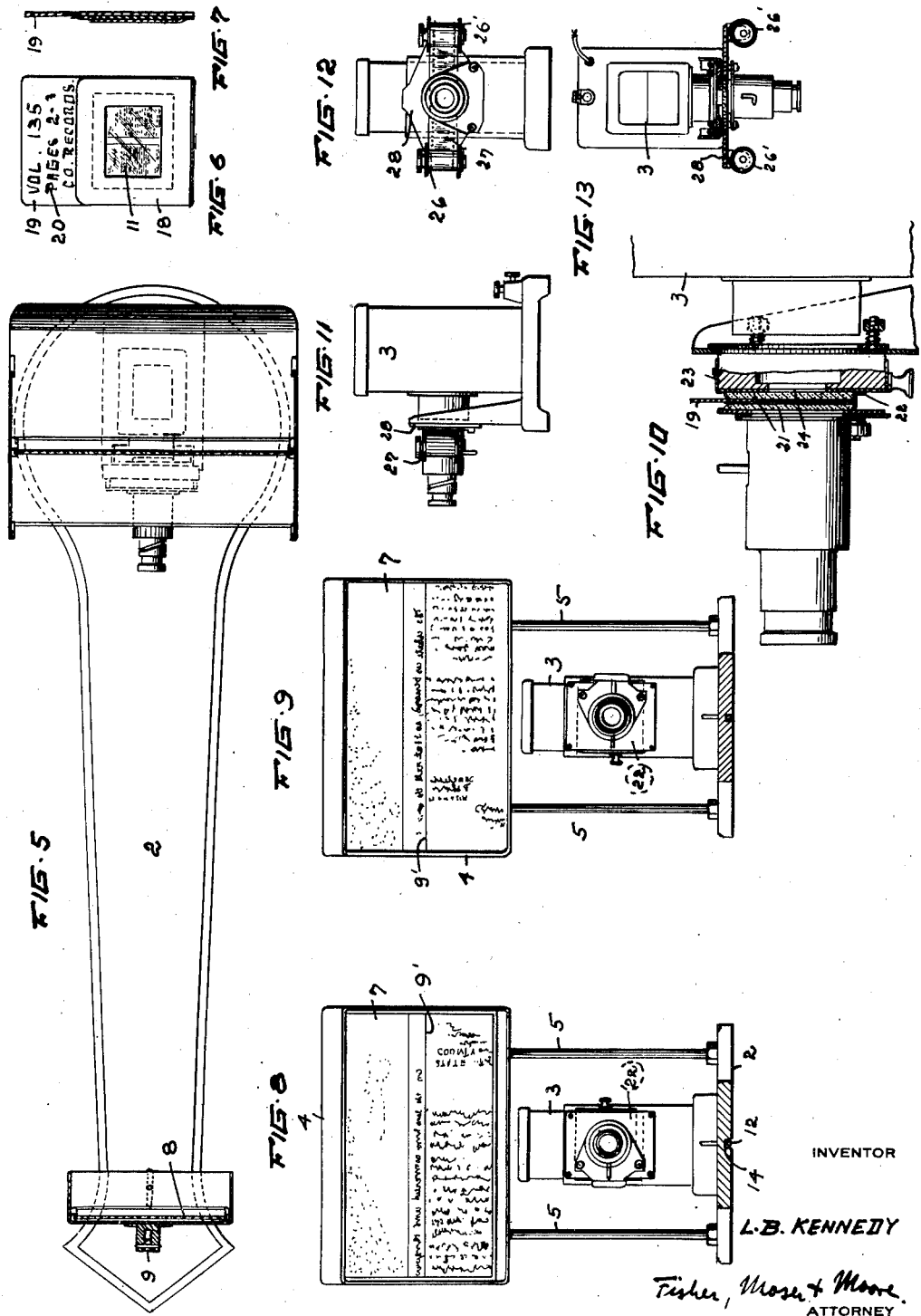

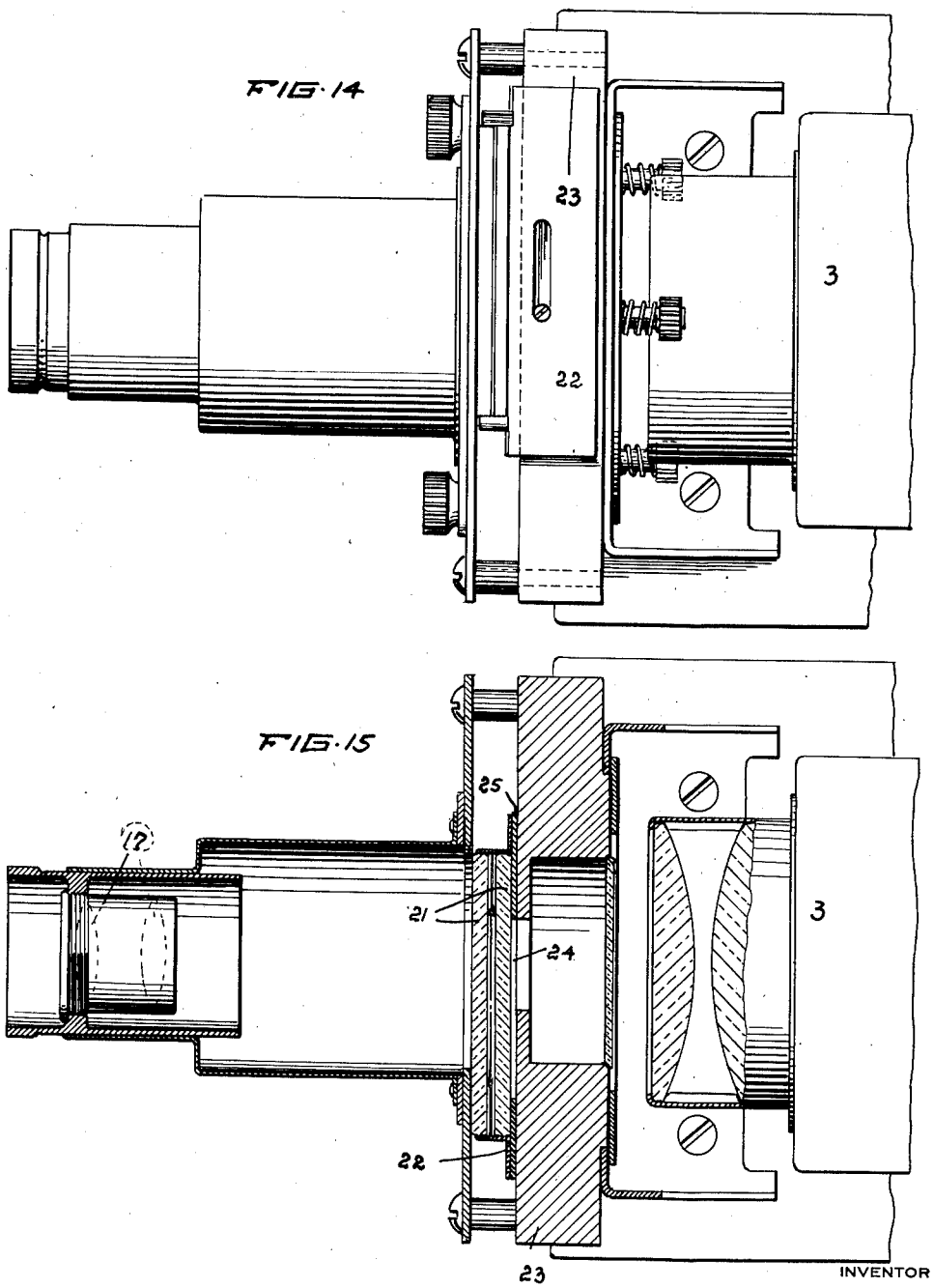

March 13, 1934.  L. B. KENNEDY  1,951,054
PROJECTION LANTERN
Filed June 19, 1931  4 Sheets-Sheet 4
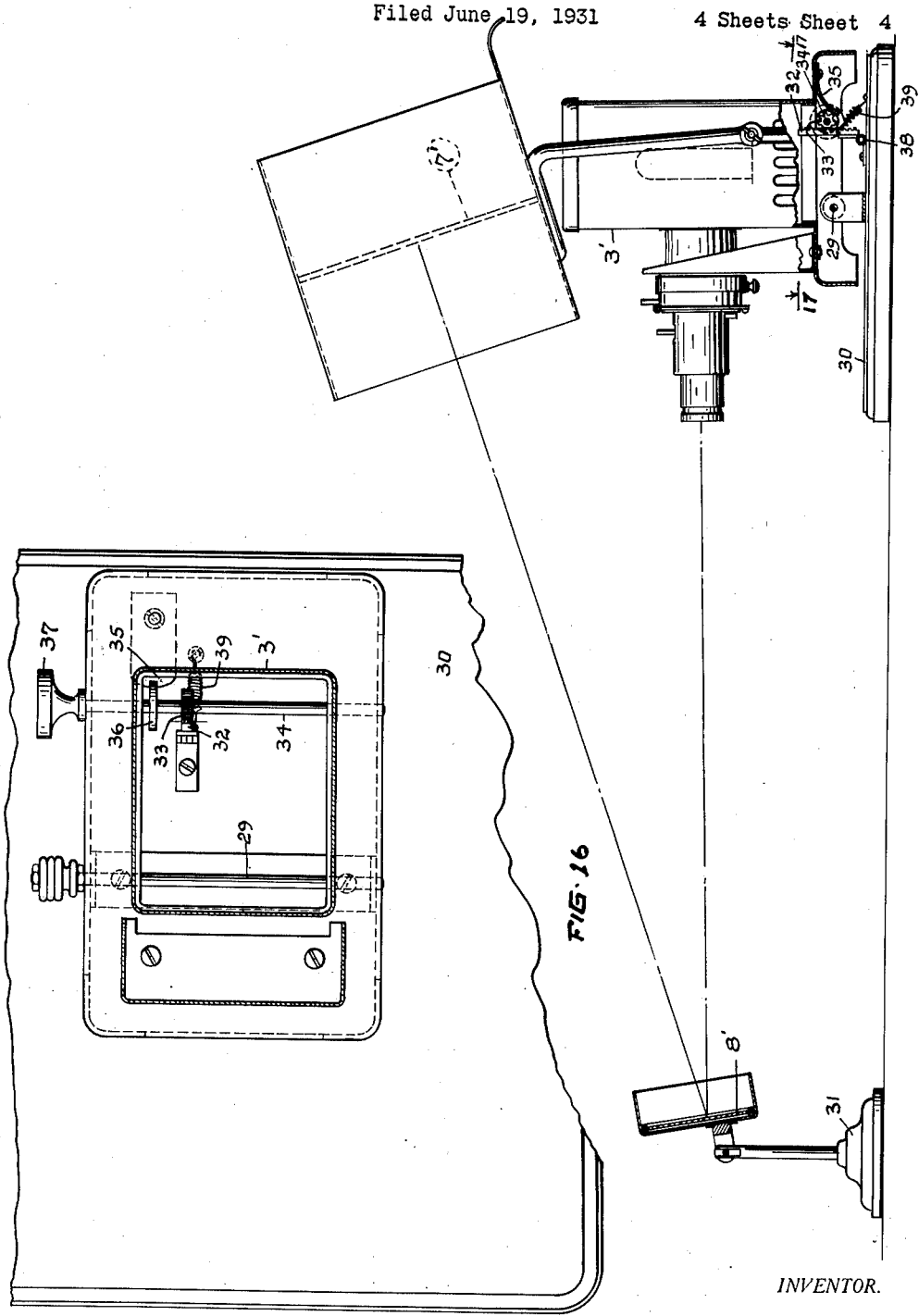
INVENTOR.
L. B. KENNEDY
BY
Fisher, Moser + Moore.
ATTORNEY.

Patented Mar. 13, 1934

1,951,054

UNITED STATES PATENT OFFICE 1,951,054

PROJECTION LANTERN

Lloyd B. Kennedy, Warren, Ohio

Application June 19, 1931, Serial No. 545,390

3 Claims. (Cl. 88—24)

The present invention relates to projection lanterns, and the object of the invention in general is to provide a simple portable apparatus which may be easily handled and manipulated to enlarge and project small areas of portions of a relatively small picture or image step by step or progressively upon a screen, such as a ground glass plate, located in close proximity to the operator. Thus the apparatus is particularly designed to enlarge and project small photographic negatives or films of written or printed documents, such as the pages of a book on which land titles, deeds, mortgages, etc. are recorded. The apparatus is compactly built so that it may be used conveniently where room and space is limited, and its construction permits any desired portion or part of the picture or image to be enlarged in considerable degree so that in the case of written or printed matter, single lines or a few lines thereof may be made very legible and brought sharply into view progressively on the screen. Thus, the whole picture or image on a negative or film is not projected and displayed on the screen at once but only successive parts of the picture or image, say a few lines or line by line of printed matter, or narrow zones thereof. Preferably a photographic negative is used, so that the background of the image on the screen is dark and the only light projected through the screen is that which depicts the written or printed matter, thus relieving eye strain. The screen itself and all controlling devices for the apparatus are also located in close proximity to the projector so that the operator may manipulate the apparatus very conveniently while situated very near or closely to the screen itself, say within a foot or two. Accordingly a typist may manipulate both a typewriter and the present apparatus when these devices are stationed closely together. In that connection it should be understood that the apparatus is primarily designed to facilitate the copying of deeds, and like instruments in writing, by typists. To promote that purpose still further, the apparatus is particularly constructed to permit the negative or picture to be rotated and placed in different angular positions so that the picture may be projected in like manner on the screen, thereby permitting the marginal portions of a deed or other instrument in writing to be displayed horizontally on the screen and so easily read. Provision is also made to permit two or more pages of a deed or like instrument in writing to be projected, line after line, without removing the negative or film from the projector. That is, the negative or film contains two or more pictures or images in juxtaposition or side by side, and either one may be projected onto the screen line by line, by shifting the negative relatively to the axis of the projector, which embodies a slidable carrier or holder for a negative in the form of a plate, or reels for supporting a film in the form of a strip.

These and other objects and advantages, are embodied in the details of construction hereinafter more specifically described, and a preferred embodiment of the invention is shown in the accompanying drawings, in which Fig. 1 is a side elevation of the complete apparatus; Fig. 2 an end elevation; and Fig. 3 a vertical section on the longitudinal medial line of the device. Fig. 4 is a cross section of the base member and a front view of the projector and screen. Fig. 5 is a horizontal section and top view of the apparatus. Fig. 6 is a front view of a mounted negative, and Fig. 7 a sectional view thereof. Figs. 8 and 9, respectively, are front views of the projector and screen, showing the rotatable plate holder in different positions to display the opposite border portions of the image horizontally on the screen. Fig. 10 is a side elevation of the projector and a sectional view of the slide for holding the mounted negative. Figs. 11, 12, and 13, are side, end and top views, respectively, of a projection lantern adapted to use a moving picture film. Fig. 14 is an enlarged top view of the projector and the negative holder therein, and Fig. 15 is a sectional view horizontally through the same parts showing the negative holder shifted to a different position therein. Fig. 16 is a modified form of the apparatus and Fig. 17 a sectional view on line 17—17 of Fig. 16.

The apparatus comprises a base member 2, which in a preferred form of the apparatus, is about four feet long. A projection lantern 3 of any suitable kind or make is detachably affixed to, or removably seated upon, said base member at one end thereof beneath a rectangular box or frame 4 which is open at its ends and supported on standards or brackets 5—5 extending upwardly from base member 2. Lantern 3 is situated between the brackets and a curved extension or apron 6 on the box or enclosed frame 4 covers the lantern and provides a light shield at this point. The open-ended box or frame 4 contains a central partition or screen 7 made of ground glass or any other suitable translucent or transparent material adapted to display a picture or image thereon when projected from lantern 3 in the way and by the means now to be described.

Thus, screen 7 is fixed in a vertically-inclined position directly above lantern 3 and faces a mirror 8 which is pivoted or hinged to a post 9 or other support extending upwardly from the front end of base member 2. Mirror 8 is pivoted to swing on a horizontal axis located a substantial distance from lantern 3 and extending at right angles to the focal axis of the lantern so that a sharply-defined enlarged image may be projected upon the flat surface of the mirror and thence reflected rearwardly toward the lantern and screen 7. When mirror 8 is tilted on its pivot the reflected image is caused to move or sweep upwardly or downwardly over screen 7 dependent upon the direction of tilt given to the mirror. The screen is provided with a horizontal index or sight line 9' to promote the reading of each line of printed matter projected on the screen, and by tilting the mirror in graduated degree or step by step intermittently, the successive lines of a document will be placed in register with the index line 9' and easily observed and read apart from whatever else may be projected on the screen. The area of the screen is less than the total enlargement of the image so that the major portion of the image is excluded from the screen to minimize the making of mistakes and errors in reading or copying the subject matter. The box or frame for the screen is also relatively deep to provide an enclosed screen chamber which will be dark enough to bring out the picture or make it plainly visible on the screen. The negative, diapositive, or film 11 placed in the projector or lamp is preferably one having an opaque background or field so that only the printed or written matter will be displayed by the light rays filtering through the screen and the remaining portion or main body of light will be dimmed or excluded from the sight of the operator.

The means for tilting mirror 8 may be of any suitable kind or nature providing that it extends to and is within the controllable reach of the operator stationed at the rear of the lantern and screen. As shown, I provide a reciprocable rod 12 within a longitudinal slot 14 at the bottom of base member 2 to tilt mirror 8, one end 15 of the rod being bent upwardly at right angles to engage the frame of the mirror and the opposite end of the rod having a handle or knob 16 adapted to be grasped and manipulated by the operator. The clamping friction at the mirror pivot, or friction applied to the rod where fastened to base member 2 serves to hold the mirror in any of its tilted positions when no movement or shift of the picture on the screen is desired.

The apparatus described permits relatively small photographic negatives or diapositives to be used in the projector or lantern, while the enlargement thereof is displayed very clearly and progressively in sections or narrow zones on the screen closely to the vision of the operator when he is stationed at the lantern and where he may control the operation of the mirror and also the lantern without moving from his station. The operator is also always in position to deposit and remove, or to shift and move, the negative, print or film, in the lantern.

Preferably, two or more pages of a book, or document, are photographed side by side or co- laterally on a single small negative or film, and this multiple negative or film placed in a movable or shiftable position opposite the enlarging lens or lenses 17 in the projection lantern so that each picture or image on the negative or film may be successively projected on the mirror and screen in the way herein described. To promote that purpose, a double negative or one with a multiple number of pictures or images, is mounted on or within a card-board frame or mounting 18 having a supplemental tab or extension 19 provided with printed or written designating or identifying marks 20. This mounted negative is slipped between two glass plates 21—21 forming part of a slide or holder 22 adapted to be shifted transversely within a rectangular frame 23 secured to the lantern between the lenses and the source of light or lamp therein. The tab or extension 19 for the negative projects outwardly from one side of the slide and is exposed so that the operator may grasp it with his fingers, and the slide 22 is also exposed so that he may engage it with his finger and shift it back and forth relatively to the focal axis of the lantern, where a rectangular opening 24 in a cross wall or partition 25 in the lens tube permits the light rays to pass to the lens. Opening 24 is of the same size as one of the images or pictures on the multiple negative or film, and it is located on the focal axis of the lantern, so that only one image or picture on the negative or film is exposed to the light. But by shifting the slide or reciprocating it the images or pictures may be projected separately on the mirror and screen.

In Figs. 12, 13 and 14, I show two reels 26—26' and a negative or film 27 in the form of a strip or band having a series of separate images or pictures thereon. The holder 28 for this device may be interchanged or substituted for the slide and its holder. Furthermore each holder and the telescopic or extensible lens tubes to which it is secured, is supported rotatably on the lantern so that the negative or film and the picture or image thereon may be rotated about the focal axis of the lantern, and the image or picture projected on the mirror and screen while so related, thereby permitting the longitudinal marginal portions of a deed or document to be displayed on the screen parallel and in register with the horizontal index or sight line 9. Briefly, by rotating the holder for the negative or film the image or picture will be displayed in a like position on the screen so that any printed or written matter extending longitudinally of a document, say at either border edge thereon, will extend horizontally across the screen and be easily read or copied, and by tilting the mirror as hereinbefore described successive linear zones of the picture or image will be displayed in register with the index line on the screen.

In Figs. 16 and 17 I show a modified form of the apparatus previously described, in which the lantern 3' is pivoted to swing on a horizontal shaft 29 mounted on base 30, while mirror 8' is rigidly but adjustably mounted on its base 31. Tilting of lantern 3' on its pivoted support will cause the image to move upwardly or downwardly over screen 7' dependent upon the direction or tilt given to the lantern.

The means for tilting the lantern 3' may be of any suitable kind or nature but as shown, I provide a rack bar 32 engaging a pinion 33 on shaft 34 rotatably mounted in the base of the lantern held in any adjusted position by means of a braking device consisting of a spring member 35 yieldingly engaging a brake disk 36 on shaft 34, which may be rotated by knob 37. Rack bar 32 is at 38 pivotally mounted to assure proper engagement with pinion 33 when rotated around shaft 30 and in yieldingly forced position against pinion 33 by spring member 39.

What I claim, is:

1. An apparatus as described, comprising a tiltably mounted projection lantern, means including a gear and rack bar to control tilting movements of said lantern a mirror spaced apart from said lantern upon which an image may be projected, and an open-ended box tiltably mounted adjacent said lantern having a translucent screen therein lying in an inclined plane relatively to the focal axis of said lantern over which the reflected image may be caused to pass by tilting said lantern.

2. An apparatus as described, comprising a tiltably mounted projection lantern, means including a gear and a pivotally supported rack bar arranged apart from the tilting axis of said lantern to control tilting movements of said lantern, an enclosed screen stationed adjacent said lantern, said lantern having a rotatable mounting embodying a shiftable slide for the image to be projected, and a pivotally supported mirror upon which the image may be projected and thence reflected to said screen.

3. An apparatus as described in claim 2, including a spring for yieldingly forcing said pivotally supported rack bar toward said gear to cause continuous engagement of said bar and gear during tilting movements of said lantern.

LLOYD B. KENNEDY.